Nov. 12, 1929.  H. C. WIESS  1,735,484
LOADING TANK CARS AND THE LIKE
Filed May 7, 1925  2 Sheets-Sheet 2
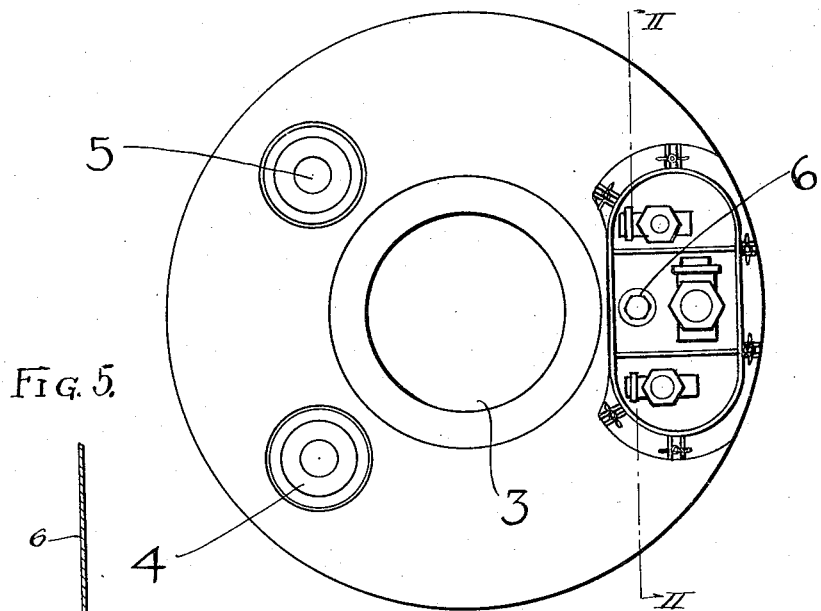
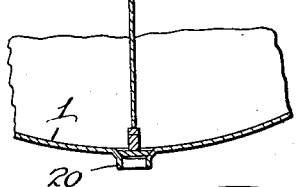
Fig. 5.
Fig.-2
Fig.-3
Fig.-4
Harry C. Wiess, Inventor
By Attorney Patented Nov. 12, 1929

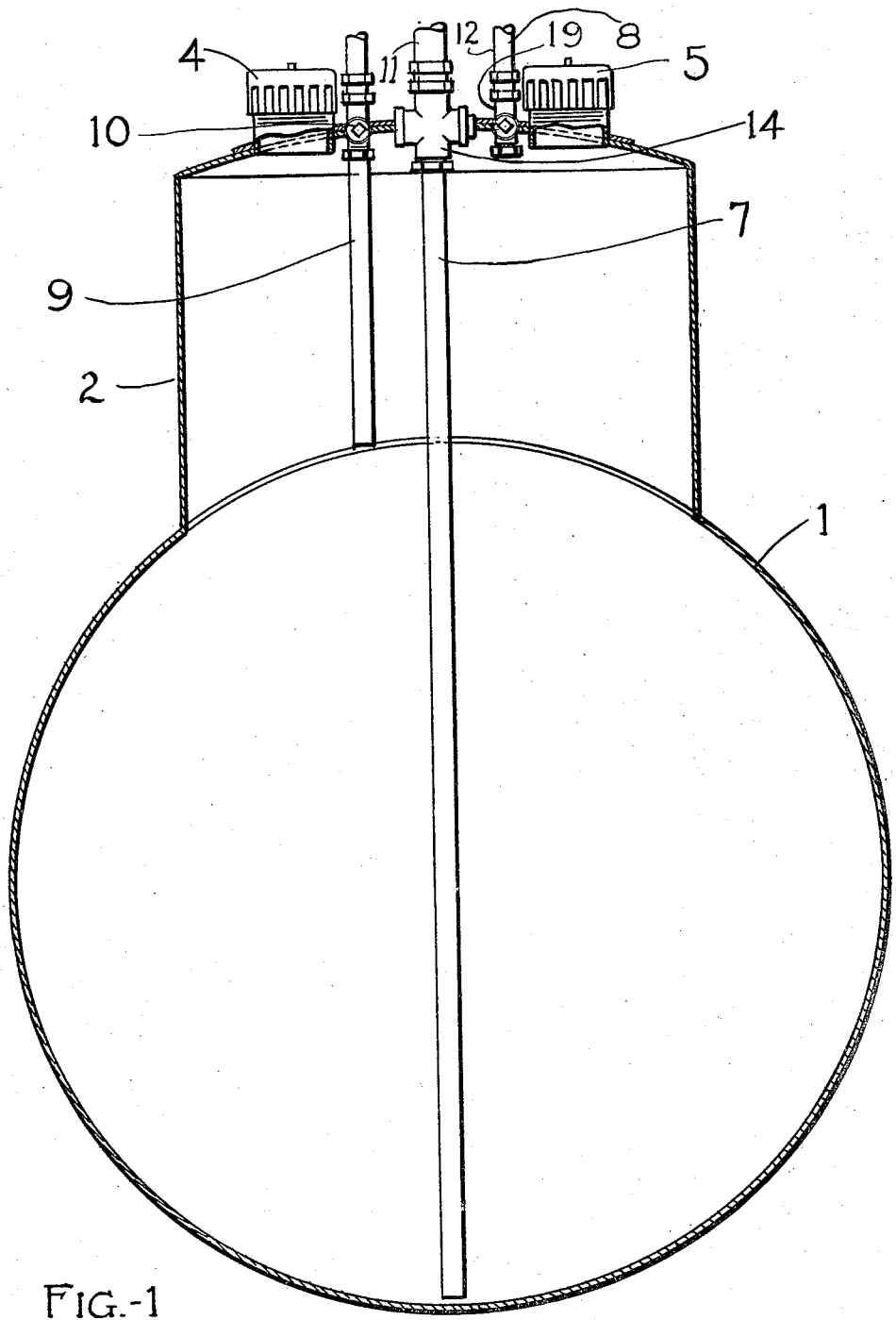

1,735,484

UNITED STATES PATENT OFFICE

HARRY C. WIESS, OF HOUSTON, TEXAS, ASSIGNOR TO HUMBLE OIL & REFINING COMPANY, OF HOUSTON, TEXAS, A CORPORATION OF TEXAS

LOADING TANK CARS AND THE LIKE

Application filed May 7, 1925. Serial No. 28,583.

This invention relates to improvements in apparatus and methods for loading receptacles with liquid, especially tank cars adapted for the transportation of casinghead gasoline. The invention will be fully understood from the following description, taken in connection with the accompanying drawings, in which Fig. 1 is a vertical section through a tank car having a dome;

Fig. 2 is a top plan view of the dome;

Fig. 3 is a side elevation showing a protective hood in position;

Fig. 4 is a fragmentary view showing the device connected to the loading rack lines; and Fig. 5 is a fragmentary section on line II—II of Fig. 2, showing the detail of the bottom draw-off valve, the function of which is described below.

In the drawings, reference numeral 1 denotes a tank car having a dome or expansion chamber 2. The dome may be provided with a dome cover or manhead 3, safety valves 4 and 5, a bottom-valve actuating rod 6, charging pipe 7, and gas vent 8, all as in usual practice. At the bottom of the car shell there is provided a bottom draw-off valve 20 actuated by the rod 6.

In accordance with the present invention, a pipe or conduit 9, having a valve 10, is fitted in the dome 2. The open lower end of the pipe 9 terminates approximately in the plane of the top of the car shell. This pipe is utilized in the withdrawal of surplus liquid from the loaded car, and automatically regulates the loading of the car "shellful", as will appear from the following description of the operation of the device.

The car is filled with liquid, for example casinghead gasoline, through a line 11 connected to pipe 7. The vent 8 is in communication with a line 12 for conveying gases to a gas holder (not shown). In the preferred method of loading gasoline it is charged into the car until the tank and dome are full. The height of liquid may be indicated by a gauge glass 13 inserted in the gas line 12, or in any other suitable way. A valve 14 in line 7 is then closed and the car allowed to stand until the liquid has come to rest. The valve 10 in pipe 9 is then opened. Gaseous pressure is applied through the vent 8 to expel all surplus liquid in the dome through pipe 9, which may be connected to the supply tank.

It will be evident that the gaseous pressure is relieved as soon as the liquid level reaches the bottom of pipe 9. This pipe may be of any desired length or may be adjustable. Ordinarily, it will terminate nearly on a line with the top of the car shell, as shown. Gas may be passed in for a short period after the liquid has been expelled, so as to fill the dome with gas and minimize access of air. Hydrocarbon gases are ordinarily the most convenient pressure medium, but any suitable fluid pressure means may be used.

The automatic regulation of the height of liquid, as described above, has important advantages. In prior practice it has generally been necessary to use calibrated charging tanks, from which a measured amount is supplied to the cars, or to depend upon stopping the supply of liquid at just the right moment. The difficulties inherent in these and similar methods are substantially avoided by the present invention.

The procedure described has the further important advantage of permitting the loading, and the "topping" or removal of surplus liquid, without allowing any substantial amount of vapors to escape from the car. Heretofore it has been the practice to remove the dome cover at intervals during charging, for inspection purposes, or to leave the cover off altogether at such times. The escape of inflammable vapors, incident to these prior methods of loading, is a serious fire hazard.

A hood 15 may be provided to protect the various pipes fittted in the dome. The hood may be secured to the tank car by bolts 16 having wing nuts 17. A chain 18 is provided to hold the hood on the car, when the hood is removed to permit charging.

In the unloading of the car the hood 15 is removed, the gas line 12 is connected to vent 8 and a valve 19 controlling the vent is opened to release pressure on the car. The rod 6 is actuated to open the bottom valve 20, valves 10 and 14 being closed. The car is then pumped out through the bottom valve, or the liquid is otherwise suitably removed. During the withdrawal of liquid, gas enters the car from the gas line 12, thus minimizing entrance of air. In distinction to prior constructions, the present invention permits the unloading of tank cars without opening the dome cover.

While the invention has been particularly described in connection with tank cars, I contemplate applying it to other receptacles also in which analogous conditions exist. The invention is not limited to the precise details of construction shown, and various modifications may be made within the scope of the appended claims, in which it is my intention to claim all novelty inherent in the invention as broadly as the prior art permits.

I claim:

1. In a liquid receptacle of the type comprising a body portion and an expansion dome connected thereto, a charging pipe and a gas vent fitted in said dome, a bottom draw-off valve in the body portion and a bottom-valve actuating rod fitted in the dome and extending to the exterior of the same, whereby it may be actuated without removing the dome.

2. A tank car comprising a body, an expansion dome connected thereto, a charging pipe and a gas vent pipe fitted in said dome, a bottom draw-off valve in the car and a bottom-valve actuating rod fitted in the dome and extending to the exterior of the same, whereby it may be actuated without removing the dome.

3. In a liquid receptacle of the type comprising a body portion and an expansion dome connected thereto, a charging pipe and a gas vent fitted in said dome, a liquid withdrawal pipe fitted in the dome and having its lower end open for the free passage of liquid and substantially in the plane of the top of the body, a bottom draw-off valve in the body portion and a bottom-valve actuating rod fitted in the dome and extending to the exterior of the same, whereby it may be actuated without removing the dome.

HARRY C. WIESS.